United States Patent [19]
Wegerhoff et al.

[11] Patent Number: 4,786,017
[45] Date of Patent: Nov. 22, 1988

[54] HIGH TEMPERATURE-RESISTANT FIBROUS SILICON DIOXIDE MATERIAL

[75] Inventors: Arno Wegerhoff, Worth; Hans-Dieter Achtsnit, Elsenfeld-Eichelsbach, both of Fed. Rep. of Germany

[73] Assignee: AKZO NV, Netherlands

[21] Appl. No.: 96,251

[22] Filed: Sep. 9, 1987

Related U.S. Application Data

[63] Continuation of Ser. No. 729,123, May 1, 1985, abandoned.

[30] Foreign Application Priority Data

May 4, 1984 [DE] Fed. Rep. of Germany ....... 3416503
Mar. 25, 1985 [DE] Fed. Rep. of Germany ....... 3510753

[51] Int. Cl.$^4$ .......................... B64G 1/58; C04B 35/14
[52] U.S. Cl. .................................... 244/158 R; 501/4; 501/95; 501/133
[58] Field of Search .................... 501/4, 95, 133; 244/158 R

[56] References Cited

U.S. PATENT DOCUMENTS

| 3,821,070 | 6/1974 | Mansmann et al. | 264/65 |
| 3,944,702 | 3/1976 | Clark | 428/288 |
| 4,050,946 | 9/1977 | Li | 501/4 |
| 4,180,409 | 12/1979 | Mansmann | 501/4 |
| 4,332,600 | 6/1982 | Wegerhoff et al. | 65/2 |
| 4,332,601 | 6/1982 | Wegerhoff et al. | 65/2 |
| 4,362,768 | 12/1982 | Ritter, II | 427/307 |
| 4,395,388 | 7/1983 | Kaduk | 501/4 |
| 4,471,019 | 9/1984 | Wegerhoff et al. | 428/224 |

FOREIGN PATENT DOCUMENTS

| 160232 | 11/1985 | European Pat. Off. | 501/95 |
| 2446278 | 1/1977 | Fed. Rep. of Germany . | |
| 2041321 | 10/1977 | Fed. Rep. of Germany . | |
| 2609419 | 4/1978 | Fed. Rep. of Germany . | |
| 2900990 | 7/1980 | Fed. Rep. of Germany . | |
| 2900991 | 7/1980 | Fed. Rep. of Germany . | |
| 2925447 | 1/1981 | Fed. Rep. of Germany . | |
| 1525803 | 9/1978 | United Kingdom . | |
| 2047297 | 11/1980 | United Kingdom . | |

OTHER PUBLICATIONS

Chemical and Engineering News, vol. 44, No. 5, p. 32, Jan. 31, 1966.

Primary Examiner—Steven Capella
Attorney, Agent, or Firm—Parkhurst, Oliff & Berridge

[57] ABSTRACT

Fibrous silicon dioxide material that is resistant to high temperatures, particularly in the form of mats or plates, is produced by dry-spinning water glass into water glass fibers, the water glass fibers being then transformed into silica fibers by treatment with aqueous acid or salt solutions that contain hydrogen ions. The silica fibers are thereupon treated with an agent that accelerates the formation of cristobalite from amorphous silica. Such agents include, in particular, alkali hydrogen phosphates, sodium acetate and solium chloride. The fibers are dried and dehydrated at temperatures above 600° C., particularly between 950° C. and 1050° C., before or after treatment with the accelerating agent. There dehydration occurs after such treatment, the fibers are subsequently subjected to thermal aftertreatment. When subjected to 1500° C. temperatures, the material thus obtained generally shrinks by less than 3%; it has very little tendency to become brittle and is particularly well suited for the fabrication of high temperature insulation material.

7 Claims, No Drawings

HIGH TEMPERATURE-RESISTANT FIBROUS SILICON DIOXIDE MATERIAL

This is a continuation of application Ser. No. 729,123 filed May 1, 1985 now abandoned.

The present invention relates to high temperature-resistant fibrous silicon dioxide materials, such as staple fibers, fiber mats, plates and other objects, containing silicon dioxide fibers with very high silicon dioxide content, presenting excellent characteristics at high temperatures, particularly at temperatures of up to 1500° C. and above, produced by the method comprising dry-spinning water glass into water glass fibers and converting the water glass fibers into silica fibers followed by dehydration.

BACKGROUND OF THE INVENTION

Silicon dioxide fibers with high silicon dioxide content have been known for a long time. It is possible, for instance, to produce fibers from pure quartz; however, this requires very high temperatures. Such a process is highly energy-intensive; moreover, it requires elaborate equipment because of the high melting point of quartz, so that melt-spun silica fibers end up being very costly to produce.

A large part of the sodium oxide and oxides (other than silicon dioxide) can be removed from glass fibers by acid leaching. But the mechanical properties of fibers treated in such manner are not entirely satisfactory, particularly with respect to their resistance to very high temperatures.

Efforts have been made to enhance the characteristics of a great variety of inorganic fibers partially or entirely composed of silicon dioxide by subjecting them to aftertreatment with a number of agents. Some of these processes have even resulted in improved stability at high temperatures. Thus, German Patent Application No. 29 25 447 discloses a method in which glass fibers are treated, before or after their extraction, with silica, as polysilicic acid in colloidal or suspension form, or with dissolved silica salts to raise the $SiO_2$ content of the glass fibers. This is done to increase tensile and buckling strength. Such a process also improves fiber resistance to high temperatures. But it does not produce fibers that maintain good characteristics at 1500° C.

U.S. Pat. No. 4,362,768 discloses a method in which glass fibers are treated with a special leaching agent, namely tetrahydrofuran - 2,3,4,5 - tetracarboxylic acid. After drying, these fibers are treated with colloidal silica and then subjected to additional processing with an aqueous solution containing salts of metals such as chromium, aluminum, zirconium, titanium and metals in Group II of the periodic table. The fibers subjected to this aftertreatment are dried; they keep their flexibility even after treatment at temperatures as high as 871° C. But this U.S. Patent does not provide any indication regarding the production of fibers that maintain very good stability at very high temperatures, i.e. for applications at 1500° C. These aftertreatments, such as the use of chromium compound in particular, serve to maintain the glass characteristics of the fibers and to prevent crystallization.

German Patent Apecification No. 20 41 321 discloses a method for the production of silicon dioxide fibers involving the spinning of hydrolyzed tetra-alkoxy hydrosilicons or hydrolyzed alkoxy polysiloxanes in the presence of dissolved polyethylene oxide; as disclosed in this German specification, these fibers maintain their amorphous structure, even when heat treatments at temperatures of up to 1500° C. are applied. German Patent Application No. 26 09 419 also describes silicon dioxide containing fibers that offer a very high degree of resistance to devitrification, i.e. that remain essentially amorphous. As the above documents demonstrate, the formation of cristobalite has, up to now, been considered undesirable.

Moreover, journals and the patent literature make numerous references to aftertreatment of inorganic fibers by a great variety of agents and describe fibrous materials in which the fibers are held together by a binding agent. German Patent Specification No. 24 46 278, for example, describes fiber compounds that contain a binding agent based on colloidal silicon dioxide and a siloxane-based matrix. The fiber compounds described therein may also contain cellulose fibers, so that the use of these fiber compounds at high temperatures is out of the question.

U.K. Patent Application No. 2,047,297 describes fibrous materials that are based on inorganic staple fibers, preferably of polycrystalline structure, such as alumina fibers, aluminosilicate fibers, zirconia fibers, iron oxide fibers or metal fibers. Phosphoric acid, phosphates, silica sols or aluminum chlorohydrate serve as binding agents. But no indications can be found in this patent application about the production, starting from amorphous silicon dioxide fibers, of fibrous material resistant to high temperatures.

In the known state of the art, polycrystalline fibers, consisting at least in large part of aluminum oxide, must be used to obtain objects that maintain dimensional stability at high temperature. Thus, Example 9 of U.K. Patent Application No. 2,047,297, cited above, describes pads that are made of polycrystalline fibers containing 95% alumina fibers (Saffil) and that maintain dimensional stability at 1400° C. But the alumina fibers required to produce these insulation materials are expensive. Thus attempts have been made to replace such polycrystalline fibers entirely or in part by so-called ceramic fibers, a designation applied to amorphous fibers produced from the melt, comprising essentially, for instance, silicon dioxide and alumina in about equal parts. Although this method produces significantly cheaper insulation materials, the trade-off is reduced resistance to high temperatures.

While many aftertreatment methods for inorganic fibers are already well known, and it is also known how to produce materials such as fiber mats, plates and other objects from such fibers, there remains the need for a high temperature-resistant fibrous material that is easy and cost-efficient to manufacture, is stable at high temperatures, especially at about 1500° C. and above, undergoes minor shrinkage and has little tendency to become brittle.

OBJECTS OF THE INVENTION

An object of the invention is to make available a fibrous material that resists high temperatures, has a low degree of shrinkage at temperatures of about 1500° C., has little tendency to become brittle, is suitable for continuous use at high temperatures and can thus be used as insulating material for high temperature applications, and to provide a method for producing such a material.

Another object of the invention is to make available such a fibrous material whose production does not require a melt-spinning process and which, contrary to glass fibers, does not also have to be leached to reduce the non-alkaline oxide content.

A further object of the invention is to provide a method (involving considerably reduced energy consumption) for the production of high temperature-resistant fibrous material with steady, reproducible characteristics.

DETAILED DESCRIPTION OF PREFERRED EMBODIMENTS OF THE INVENTION

These and other objects of the invention are achieved by high temperature-resistant fibrous silicon dioxide material made of silicon dioxide fibers obtained by the dry-spinning of water glass into water glass fibers, and the conversion of the water glass fibers into silica fibers followed by dehydration. The silicon dioxide fibers preferably have a silicon dioxide content of 95% by weight, a density of 1.9 to 2.4 g/cm3, a microcrystalline cristobalite content of more than 5% and a shrinkage at high temperature, measured as area shrinkage, of less than 5% in a mat of the silicon dioxide fibers after one hour of treatment at 1500° C. Preferably, the shrinkage at high temperature is less than 3%. It is particularly advantageous if the silicon dioxide fibers have a cristobalite content of more than 10%. It is also advantageous if the silicon dioxide fibers have a silicon dioxide content of more than 98% and, particularly, of more than 99% by weight.

Such fibrous material can be produced by a method in which water glass, essentially free of non-alkali metal compounds and having a molar ratio $Na_2O:SiO_2$ of approximately 1:3 to 1:1.9, is spun to water glass fibers by the dry-spinning process, the water glass fibers are treated with aqueous acid or salt solutions containing hydrogen ions to convert the sodium silicate into silica, the silica fibers thus obtained are washed and treated with an agent that accelerates formation of cristobalite from amorphous silica, and the fibers are dehydrated at temperatures above 600° C. The fibers may, if desired, be shaped, preferably into mats or plates, and dried before dehydration. It is preferred that, after washing, the silica fibers are treated while still wet with the agent that accelerates cristobalite formation. The dehydration is advantageously carried out at temperatures above 900° C., preferably between 950° C. and 1050° C. It is also advantageous that, after action by the agent has been allowed to take effect, the silica fibers are dried by microwave irradiation. Alkali metal salts with anions containing an element from the fourth to the seventh main group of the periodic table are particularly preferred as agents for accelerating cristobalite formation. Among alkali metal salts with anions containing an element from the fourth to the seventh main group of the periodic table, aqueous solutions of hydrogen phosphates adjusted to a pH of 5 to 8 are especially preferred.

In a further preferred embodiment of the method of the present invention, the water glass (essentially free of nonalkaline metal compounds and having a molar ratio $Na_2O:SiO_2$ of approximately 1:3 to 1:1.9) is spun to water glass fibers by the dry-spinning process, the water glass fibers are treated with aqueous acid or salt solutions containing hydrogen ions to convert the sodium silicate into silica, the silica fibers thus obtained are dehydrated at temperatures above 600° C., then treated with an agent that accelerates formation of cristobalite and subjected to thermal aftertreatment at temperatures above 400° C. to trigger crystallization.

In a preferred embodiment of the invention, silica fibers milled and dehydrated to staple lengths of 80–2000 μm are dispersed in an aqueous solution of the agent, shaped (e.g. into a plate by filtration), and dried before triggering crystallization to cristobalite.

Production of the fibers in accordance with the method of the invention can proceed as follows.

A water glass solution is prepared that has a molar ratio of $Na_2O:SiO_2$ within a range of 1:3 to 1:1.9. Water glass fibers are produced from such water glass solutions by the dry-spinning method and are then converted into silica fibers by treatment with aqueous acid or salt solutions containing hydrogen ions. In this connection, attention is called to the disclosures of German Patent Applications Nos. P 29 00 990.3-43 and P 29 00 991.4-43.

The resultant silica fibers are washed and, preferably without prior drying, are then treated with an agent that accelerates the production of cristobalite from amorphous silica. The silica fibers, preferably available as staple fibers or as short-cut fibers, may be treated in a bath containing the agent while they are still wet.

The spun silica, initially available in the form of filaments, is processed into staple fibers or short fibers by cutting, using cutting devices known to the art, by tearing or by milling, preferably wet-milling. The silica fibers can then be processed as flocculent mass, e.g. in larger containers, care being taken that the mass is not pressed too tightly, so the liquid agent can completely wet the fibers.

In general, treatment of short duration, such as ½ minute, is sufficient for impregnation of the fibers. The flocculent mass is then rid of any excess liquid agent. Undried silica fibers dispersed in the liquid agent can be processed directly into the object appropriate to the desired use of the fibrous silicon dioxide material. Thus, the dispersion may be processed into a wet mat by methods commonly used in the paper industry, after which the liquid agent is removed by a screen and the mat is subjected to the drying and dehydration process. The fibers impregnated with liquid agent can also be formed into objects by compression into plates, or even by molding. The material, which is still wet, is then dried. Microwave irradiation is extremely well suited for drying since it achieves particularly uniform drying, thus preventing the agent from being unevenly distributed during the process.

The fibers are then subjected to dehydration at temperatures above 600° C. During this dehydration, microcrystalline cristobalite areas are formed from the amorphous silica.

According to the invention, the following agents are particularly suited for accelerating the formation of microcrystalline cristobalite from amorphous silica: alkali phosphates, especially hydrogen phosphates such as sodium monohydrogen phosphate and sodium dihydrogen phosphate; the corresponding potassium hydrogen phosphates; sodium acetate, sodium chloride, lithium chloride, lithium nitrate, etc. It is also possible to use mixtures of the above substances, such as sodium chloride and potassium hydrogen phosphate. For the treatment of already dehydrated fibers or of the corresponding fiber material, aqueous alkali hydroxide, such as sodium or potassium hydroxide, is particularly suited.

The method of the invention gives silicon dioxide, available in amorphous form in the silica fibers, microcrystalline structure containing 5% or more cristobalite. The size and proportion of the cristobalite crystallites may vary within wide margins and depend on the type and quantity of agent used as well as on the temperature and duration of dehydration. A preferred range for the size of crystallites is 30 to 350 angstroms.

The concentration selected for the agents, which are used primarily as aqueous solutions or dispersions, may vary within relatively wide limits. It is important that the fibrous material to be processed be completely wetted by the solution and that sufficient application of crystallization accelerator on the fiber be assured. It is particularly advantageous if the agent is sufficiently fluid to allow dispersion of the fibers. Preferred solutions or dispersions contain approximately 0.2 to 20% of the agent by weight, and more preferably 1 to 4%. In any case, the appropriate concentrations depend to a certain degree on the agent used, and one ordinarily skilled in the art can readily determine the appropriate concentrations by running a few tests.

When using aqueous alkali phosphate solutions, it is preferred to use concentrations of 0.5 to 15% by weight, more preferably 1.5 to 5%. Sodium hydroxide, which is especially suited for dehydrated silicon dioxide fibers, is preferably used as an aqueous solution with a concentration of 0.3 to 6% by weight, more preferably 0.6 to 1.5%.

The amount of the agent picked up by the fibers also depends on the solution used. In the case of sodium phosphate, so much of the agent is picked up that the sodium content of the dry and crystallized fibers measures 0.3 to 3.5% by weight. In addition, when sodium hydroxide is used, the amount of sodium silicate available depends on the stage already reached by the surface reaction during preparation of the soda lye-fiber dispersion, i.e. before filtration and shaping of the objects. In general, silicon dioxide fiber objects that are treated with sodium hydroxide, then dried and crystallized, contain 0.4 to 3.2% by weight of sodium.

In one embodiment of the invention, the fibrous silicon dioxide material may also be produced by dehydrating before treating with the agent that accelerates the formation of cristobalite from amorphous silica, then impregnating the fibrous material with the agent and subjecting it to thermal aftertreatment. In this embodiment, thermal aftertreatment may also be carried out at a later time, e.g. when the material is installed—for instance, as insulation in a furnace that is operated at temperatures above 600° C.

It was particularly surprising that the method of the invention resulted in high temperature-resistant fibrous silicon dioxide material that presents such exceptional stability at high temperatures. While, for example, mats produced from known ceramic fibers, such as aluminum silicate fibers composed of 51.3% aluminum oxide and 47.2% silicon dioxide fibers, have a shrinkage level of about 23% and become very brittle when exposed to 1500° C. for one hour, the shrinkage of a mat produced in accordance with the invention is less than 2% under identical conditions. Moreover, the fibers show very little embrittlement.

Fibrous silicon dioxide materials produced in accordance with the invention are particularly suited for thermal insulation used at high temperatures. These materials can be used under conditions where temperatures of more than 1300° occur and where there is a great need for fibers that resist such high temperatures, a need that the known fibers based on silicon dioxide have not been able to satisfy.

Since silicon dioxide fibers are of lower density than other known fibers, the fibrous material is lighter and, consequently, its use is more advantageous. Thus, sturdy and easy-to-handle plates can be produced with low volumetric weights such as 120 kg/m$^3$. Such low density is also an advantage for the insulating products made from these fibers. Objects made from the fibers of the invention can easily be sawed, cut and drilled, which facilitates their practical application. Thus, plates can readily be produced for heat insulating lining of industrial furnaces.

The very light and extremely temperature-resistant fibrous objects of the invention are also of interest for aerospace applications, such as the production of heat shields needed to protect spacecraft during re-entry into the earth's atmosphere. It is particularly significant that the fibers of the invention are of uniform diameter owing to the characteristics of the production method. They differ in this respect from nontextile glass and ceramic fibers produced by blowing or centrifugal casting. For instance, fibers with an average diameter of 10 $\mu$m can be produced in accordance with the invention, the range of variation being very small. It is also of great significance that fiber dust from these fibers does not contain any particles less than 3 $\mu$m in diameter, such particles being known to be respirable and to represent a greater health risk. Moreover, it is possible to reduce the dust content in accordance with the invention.

Another area of application is filtration, such as filtration of hot gases. Appropriately shaped filters can be manufactured for such purposes.

Concentration of cristobalite, present mainly as alpha cristobalite, in the microcrystalline areas was determined by a roentgenographic method developed by P. H. Hermans, A. Weidinger, C. Natta et al. for the analysis of crystalline areas in high polymers. Regarding the basis of these methods, reference is made to the following literature:

P. H. Hermans, A. Weidinger,
J. Appl. Phys., 19, 491 (1948)
J. Polymer Sci., 4, 135 (1949)
J. Polymer Sci., 5, 565 (1950)
P. H. Hermans, A. Weidinger, Makromol. Chem., 44-46, 24 (1961)
P. H. Hermans, A. Weidinger, Makromol. Chem., 50, 98 (1961)
P. H. Hermans, Experimmenta Vol. XIX, Fasc. 11, pp. 553–564 (Nov. 15, 1963) "Roentgenographische Kristallinitaetsbestimmung bei Hochpolymeren" (Roentgenographic crystallinity determination in high polymers)

The advantage of this method is that it requires no calibration samples of known crystallinity and that it is sufficient to have samples with different crystallinities.

X-ray diffraction spectra were recorded for the samples, and the areas of scattering from the amorphous portion $A_a$ and the crystalline portion $A_k$ were determined therefrom. The plotting of $A_k$ against $A_a$ turned out to be a straight line.

Samples of different crystallinity were prepared by mixing an amorphous silica fiber with a highly crystalline silica fiber tempered at 1500° C. in an agate mortar. A binding agent, namely 10% of an aqueous solution of acrylate sizing agent, was added so that the samples could be made into pellets in an IR press. The samples were dried at 100° C. and pressed into pellets. The pellets had a diameter of 13 mm and a thickness of approximately 1 mm.

The measurement was carried out with a SIEMENS D 500 counting tube goniometer and a copper tube with nickel filter. The spectrum is measured in the 2 theta angle range from 10° to 40° in steps of 0.05°. The counting time is 5 seconds per step. The pulse counts measured are transferred to a MACSYM 150 computer, analyzed there by computer program and plotted. The program searches for the peaks, determines the base line under the peaks and integrates the area of the peaks ($A_k$) and the area of the amorphous base line ($A_a$).

The following equation gives the degree of crystallization (KG) of the alpha cristobalite:

$$KG = \frac{100}{1 + 1.5567(A_a/A_k)}$$

The shrinkage caused by high temperatures is determined as follows:

A square piece measuring 5 cm×5 cm is cut from a mat of fibrous silicon dioxide material that has been treated with an agent that accelerates the formation of cristobalite from amorphous silica and dehydrated at temperatures above 600° C. This piece is subjected for one hour to a temperature of 1500° C. while exposed to air in a platinum dish. The area of the piece is measured after cooling. The reduction in area, expressed as a percentage of the initial area, is the high temperature-shrinkage. This test can also be applied to fiber plates by cutting out 1 cm thick square test pieces measuring 5cm×5 cm.

The following examples further illustrate the invention. These examples are presented solely for illustrative purposes, and are not to be construed as limiting the scope of the invention as defined in the appended claims.

EXAMPLE 1

Water glass threads were produced as in Example 3 of German Patent Application No. 29 00 990. Deviating from the data given in that example, the number of nozzles was 60 instead of 24 and the escape velocity was 700 rather than 500 m/min. The water glass threads were cut into fibers of 6 mm length; in each case, 10 g of these fibers were treated with hydrochloric acid as in Example 5 of German Patent Application No. 29 00 990; in lieu of the acid concentration listed as in the German application, a concentration of 3N was applied.

After washing, the silica fibers were dispersed while still wet in an aqueous solution containing 2.7% $NaH_2PO_4$ by weight, whose pH had been raised to 6.1 by addition of 10% NaOH, and were then precipitated onto a screen as a mat-like object. The fibers were dried by microwave irradiation and then dehydrated for 10 minutes at 1000° C.

The mat thus obtained was highly temperature-resistant and presented a shrinkage of less than 3% after 1-hour treatment at 1500° C. It was flexible and not brittle.

EXAMPLE 2

Example 2 describes the production of a fiber plate. Water glass threads were produced as in Example 1 and converted into silica threads. It was not necessary to cut the water glass threads down to equal lengths before the conversion.

After washing, the threads were suspended in water and "wet-milled" with a rotating cutting ring until the fiber lengths were approximately in the 80 to 2000 μm range. The fibers were dried at 120° C. and dehydrated for 10 minutes at 1000° C. 730 g of these fibers were dispersed in 15 liters of 0.6% soda lye. After filtration under approximately 150 mbar, the plate was shaped on a finely meshed screen which formed the floor of a suction box measuring 25 cm×35 cm with a height of 20 cm. The wet plate contained about 2000 g of diluted soda lye. After drying by microwave irradiation, the plate was annealed for 35 minutes at 1000° C. to trigger crystallization.

The volumetric weight of the fiber plate thus obtained was 760 kg/m³. It was very highly temperature-resistant and after 64-hour treatment at 1500° C., the shrinkage was less than 3%.

Depending on the duration of treatment, agent and temperature, other materials were obtained that had crystallization contents of 13, 23, 42, 65, 79, 87 and 97%.

What is claimed is:

1. A fibrous silicon dioxide material resistant to high temperatures, said material comprising silicon dioxide fibers obtained by dry-spinning water glass into water glass fibers and converting the water glass fibers into silica fibers, followed by dehydration of said silica fibers, said silicon dioxide fibers consisting essentially of silicon dioxide in a content of more than 95% by weight, a density of 1.9 to 2.4 g/cm³, a microcrystalline cristobalite content of more than 5% and a shrinkage at high temperatures, measured as area shrinkage in a mat made of silicon dioxide fibers after one-hour treatment at 1500° C., of less than 5%.

2. A fibrous silicon dioxide material as in claim 1, wherein said silicon dioxide fibers have a cristobalite content of more than 15%.

3. A fibrous silicon dioxide material as in claim 1, wherein said silicon dioxide fibers have a high temperature shrinkage of less than 3%.

4. A fibrous silicon dioxide material as in claim 1, wherein said silicon dioxide fibers have a silicon dioxide content of more than 98% by weight.

5. A fibrous silicon dioxide material as in claim 4, wherein said silicon dioxide fibers have a silicon dioxide content of more than 99% by weight.

6. The fibrous silicon dioxide material of claim 1 wherein said cristobalite microcrystals have an average size in the range of from 30 to 350 angstroms.

7. The heat shield for spacecraft, comprising the fibrous silicon dioxide material of claim 1.

* * * * *

UNITED STATES PATENT AND TRADEMARK OFFICE
CERTIFICATE OF CORRECTION

PATENT NO. : 4,786,017
DATED : November 22, 1988
INVENTOR(S) : A. WEGERHOFF, H. ACHTSNIT It is certified that error appears in the above-identified patent and that said Letters Patent is hereby corrected as shown below:

IN THE ABSTRACT:

Line 11, change "solium" to --sodium--;
line 14, change "There" to --Where--.

IN THE BACKGROUND OF THE INVENTION:

Column 1, line 64, change "Apecification" to --Specification--.

IN THE CLAIMS:

Claim 7, line 1, change "The" to --A-- (first occurrence only).

Signed and Sealed this

Twentieth Day of June, 1989

Attest:

DONALD J. QUIGG

Attesting Officer

Commissioner of Patents and Trademarks